United States Patent [19]

Berchielli et al.

[11] 4,041,221

[45] Aug. 9, 1977

[54] ZINC ELECTRODES AND METHODS OF MAKING SAME

[75] Inventors: Aldo S. Berchielli, Westerly, R.I.; Roland F. Chireau, Quaker Hill, Conn.

[73] Assignee: Yardney Electric Corporation, Pawcatuck, Conn.

[21] Appl. No.: 709,138

[22] Filed: July 27, 1976

[51] Int. Cl.$^2$ .......................................... H01M 10/24
[52] U.S. Cl. .................................. 429/206; 429/229; 429/231
[58] Field of Search .................. 429/206, 229–231, 429/232, 209, 218, 219, 212, 215

[56] References Cited

U.S. PATENT DOCUMENTS 3,476,601  11/1969  Berger et al. ...................... 429/229

Primary Examiner—Anthony Skapars
Attorney, Agent, or Firm—Donald E. Nist

[57] ABSTRACT

Improvements in cell capacity maintenance and reductions in electrode shape change are obtained in rechargeable zinc (−) cells by the inclusion of limited amounts of a titanate compound in the negative zinc electrode.

8 Claims, No Drawings

ZINC ELECTRODES AND METHODS OF MAKING SAME

BACKGROUND OF THE INVENTION

This invention relates to electrodes which are useful in electrochemical generators and, more particularly, to zinc electrodes for use in rechargeable electrochemical cells.

It is believed that shape change occurs in the negative plates or electrodes of cells which include zinc electrodes in alkaline electrolytes, e.g., silver/zinc and nickel/zinc cells, whenever any part of the negative plate becomes zinc limiting. The latter appears to occur at any discontinuity in the negative plate such as the plate edges and fissures within the plate. At the locations of discontinuity in the negative plate, the zincate concentration becomes dilute during charge while at other locations of the negative plate, e.g., the center, there can be an excess of zinc oxide which will maintain the electrolyte at the latter location at saturation with respect to zincate. Thus, a concentration cell can develop between the locations in the negative plate which are dilute in zincate and those locations which are associated with a high concentration of zincate. Such concentration cells can result in a transfer of zincate from one portion of the negative plate to another thereby producing shape change.

A number of methods to reduce or eliminate electrode shape change in the aforementioned cells presently exist. One of these methods involves cell construction features which function to reduce the possibility of concentration polarization build-up at the negative electrode during charge. Such a method is described in U. S. Pat. No. 3,505,115, issued Apr. 7, 1970, and assigned to the instant assignee. This patent describes the sizing of the negative plate so that it is larger than and overlaps the positive electrode.

Another method involves preventing the solubilization of the zinc as it is anodized. Such a method is described in U. S. Pat. No. 3,536,537, issued Feb. 3, 1970, and assigned to the instant assignee. The latter patent teaches the addition of a small quantity of a fluorocarbon polymer to the negative zinc electrode.

Although the methods described in the aforementioned patents provide a substantial increase in cell life, they do not completely eliminate the problems or zinc electrode edge erosion and shape change, particularly after prolonged cycling of the electrode. Additionally, whereas cells built with extended edge negative electrodes and fluorocarbon impregnated negative electrodes exhibit the benefits (although to a lesser degree) of the hereindescribed invention only after numerous charge/discharge cycles, e.g., on the order of 90 such cycles, cells containing negative electrodes as described herein exhibit improved capacity maintenance after only a few charge/discharge cycles, e.g., on the order of (3) cycles. Therefore, there remains a need for a technique which will provide further improvements in zinc electrode edge erosion and shape change.

The incorporation of various types of fibers, both organic and inorganic, in both positive and negative electrodes for the purpose of providing a physically stronger electrode is described in U. S. Pat. No. 3,271,195, issued Sept. 6, 1966, which is assigned to the instant assignee. Although the herein-described invention can provide improvements in the strength of electrodes similar to that described in the latter patent, the fibrous material identified in the latter patent are not capable of providing the improvements in cell capacity maintenance and electrode shape change which are obtainable from the herein-described invention.

U. S. Pat. No. 3,476,601, issued Nov. 4, 1969 discloses the use of about 2 percent ot about 50% by weight of a titanate compound in or against either electrode in a high density battery for the purpose of mechanically strengthening the electrodes. There is no recognition in the patent of the electrochemical improvements. obtainable from such titanate compounds. This lack of recognition is reflected in both the concentration range given for the titanate compound and in the location of the latter.

The charging current densities normally employed for charging silver/zinc cells range between 1.5 and 3.0 ma/$cm^2$. However, the limiting current density (LCD) for a cell incorporating 5% (wt.) titanate in the zinc electrode is only 0.77 ma/$cm^2$. Since the LCD decreases with increasing percent titanate in the negative electrode, it will be understood that the titanate range recommended in U. S. Pat. No. 3,476,601 is unrealistic in electrochemical terms although it may be quite acceptable in mechanical terms. In fact, mechanically strengthening the negative (and positive) electrode seems to have been the only object of the U. S. Pat. No. 3,476,601 since it discloses either incorporation of the titanate in the electrode or placement of the titanate against the electrode in order to achieve greater mechanical strength. As is well known, placement of the titanate against an electrode is not normally recommended for improvement in electrochemical properties.

SUMMARY OF THE INVENTION

This invention comprises the inclusion in negative zinc electrodes in rechargeable alkaline electrochemical cells of about 0.2 to about 1.8% by weight of the weight of the zinc oxide of an inorganic titanate compound.

The inclusion of such a titanate in the negative zinc electrode improves the cell maintenance capacity while at the same time decreasing negative electrode shape change. Additionally, if the titanate is employed in fiber form, it provides improvements in electrode mechanical strength similar to the improvement provided by the fibers disclosed in U. S. Patent No. 3,271,195. Furthermore, the foregoing benefits are obtained when using the titanate compound in the aforementioned concentration range while the maintaining a commercially acceptable limiting charging current density.

DESCRIPTION OF THE PREFERRED EMBODIMENT

This invention will be hereinafter described with respect to a silver/zinc cell although other electrochemical cells which employed zinc as the negative electrode, such as, for example, nickel/zinc, zinc/air, zinc/oxygen and mercuric oxide/zinc cells, will also be improved by this invention.

The improvement in zinc electrodes comprises the inclusion of limited amounts of an inorganic titanate compound in the mixture which is employed to fabricate the zinc electrode. The titanate compounds which are useful herein include sodium, potassium, calcium, magnesium, and barium titanates. It is presently preferred to use sodium or potassium titanate. Mixtures of these titanates can also be used.

The titanate compound can be used in various physical forms, including powders and fibers. However, it is preferred to use the titanate compound in fiber form because of the improvement in mechanical strength of the electrode which is derived from the fibers.

The amount of the titanate compound to be included in the negative zinc electrode varies between about 0.2 and about 1.8% by weight of the weight of the zinc oxide in the electrode. Below about 0.2% of titanate, there is little or no improvement in cell capacity maintenance and there is little or no effect on electrode shape change. Above about 1.8%, the electrical conductivity of the finished electrode is affected, and plates containing amounts beyond this level exhibit difficulty in charging. Additionally, above about 1.8%, the limiting charging current density of a cell utilizing electrodes incorporating the titanate compound is reduced to a level which becomes commerically unacceptable. Preferably, the titanate compound is used in amounts between about 1.0 and about 1.5 with 1.25% being most preferred. Within this preferred range, there is an optimum balance between limiting charging current density (which increases with decreasing amounts of titanate compound) and electrode resistance to shape change (which increased to a point with increasing amounts of titanate compound).

To obtain the benefits from the titanate compounds which have been described hereinbefore, it is necessary to incorporate a titanate compound in the electrode admixture so that it is substantially homogeneously dispersed in the electrode mixture. While this result may be accomplished in several ways, it is presently preferred to use the following procedure which is essentially the same procedure as that which is described is incorporated herein by reference. In brief, a viscous mixture is formed comprising zinc oxide powder, potassium titanate fibers, mercuric oxide powder, distilled water and carboxymethyl cellulose binder. This mixture is placed in a blender and agitated until a substantially uniform thixotropic suspension is obtained. The resulting suspension or slurry is cast between two layers of carried paper, e.g., Aldex paper, and passed under an oscillating doctor blade to form long strips of papered electrode material. These strips are then dried at elevated temperature, for example, on the order of 93° C. after which electrode plates are cut from them as desired. Each electrode plate is then pressed to the desired electrode thickness using, e.g., a hydraulic press. Thereafter, a conductive grid, which may be expanded metal, mesh, perforated metal or solid sheet and which is provided with an electrode terminal, is sandwiched between two electrode plates to form an electrode assembly. The latter is pressed together in a suitable press to form a unitary composite electrode.

The electrodes so made may be used in the "green" or unformed condition to be then "formed" or charged in situ in the rechargeable zinc (−) cell. On the other hand, the electrode may be formed outside the cell in order to convert at least some of the zinc oxide to active zinc metal. In the latter condition, the electrode may be used in the dry-charged condition in the previously identified rechargeable electrochemical cells.

In summary, there has hereinbefore been described an improvement in rechargeable electrochemical generators or cells having a negative electrode formed from an electrochemically active zinc material, e.g., zinc oxide, which is reduced to elemental metallic zinc in the charged state of the electrochemical generator, a positive electrode formed from a material which is electropositive with respect to the active zinc material and which is present in its oxidized form in the charged state of the cell, and including an alkaline electrolyte in electrochemical contact with the aforementioned electrodes. That improvement comprises the inclusion of an inorganic titanate compound within the zinc electrode mixture in a specific concentration range of about 0.2 – 1.8% by weight of the weight of the active negative electrode material.

This invention will be further described by the following examples.

As used in the Examples, the term "parts" means "parts by weight."

EXAMPLE 1

A slurry was prepared consisting of 100 parts of zinc oxide, 2.2 parts of Fibex L (Dupont Co.; approximately 57% by wt. potassium titanate fibers), 40 parts of 1% solution of Carboxymethylcellulose (Hercules Powder Co., Grade CMC 7HF) and 33 parts of distilled water. The slurry constituents were blended until a uniform, thixotropic blend was obtained. The pasting operation was performed by a pasting machine which spread the material uniformly between two layers "Aldex" paper by means of two oscillating doctor blades. The resulting zinc oxide strips were dried at about 93°C. The weight per unit area of each strip was 0.9 grams per square inch. The strips were cut to size by means of a die, one layer of the Aldex paper was removed, the current collector (2 mil perforated copper sheet) was placed between two strips on the paper-free side and the assembly pressed to a thickness of 42 mils. The total active mix weight per electrode was 10.4 grams.

Test cells were fabricated using the above-described electrodes. The cells consists of four positive (silver) electrodes, each 1.975 in. wide × 3.00 in. high × 0.021 in. thick and five negative (zinc) electrodes measuring 1.975 in. wide × 3.00 in. high × 0.042 in. thick, made into an LR10-5 cell assembly. The cell pack was placed in a plastic cell case which was sealed with a cover terminal assembly and the cell was filled with a 45 weight percent solution of potassium hydroxide.

Exact replicates of the test cells just described were built except that the negative electrodes in these cells obtained on additive. These cells were designated "Controls."

The test regime which consisted of charging at 0.6 amps to a cut-off voltage of 2.05 V. and discharging at 4 amps to 1.0 volt per cell (100% DOD). The results are shown in Table 1.

TABLE 1

| Cycle No. | CONTROLS (Average of 3 Cells) Capacity (amp.hr.) | TEST CELLS (Average of 3 Cells) Capacity (amp.hr.) |
| --- | --- | --- |
| 1 | 15.5 | 15.0 |
| 5 | 12.5 | 14.5 |
| 10 | 12.0 | 14.0 |
| 20 | 11.2 | 14.0 |
| 50 | 9.0 | 11.0 |

EXAMPLE 2

The procedure of Example 1 was repeated except that potassium titanate fibers were employed which differed dimensionally from the Fibex L fibers employed in Example 1 as shown in Table 2.

TABLE 2

| Trademark | Avg. Fiber Dia. (microns) | Avg. Fiber Length (microns) | Density (gm/cc) |
| --- | --- | --- | --- |
| "PKT" | 0.1 – 0.2 | 3 – 8 | 3.3 |
| "Tipersul" | 1.0 | 100 | 3.58 |
| "Fibex D" | 0.1 – 0.15 | 5 – 10 | 3.3 |
| "Fibex L" (hydrated) | 0.1 – 0.15 | 5 – 10 | 3.3 |

Substantially no difference in results was found among the fibers listed in Table 1.

EXAMPLE 3

Silver/zinc cells were fabricated which consisted of two positive (silver) electrodes and three negative (zinc) electrodes made in an HR2X cell assembly. The zinc electrodes were pasted zinc oxide plates made up of 100 parts of zinc oxide, 1.5 parts of zinc titanate powder and 1.0 part of mercuric oxide. The total mix weight per electrode was 6 grams and the electrode thickness was 45 mils. The positive electrodes were wrapped in two layers of clear, unplasticized cellophane (Dupont Code No. PuDO-193) separator material. The cell pack was placed in a plastic (Styrene-acrylonitrile polymer) cell case which was sealed with a cover-terminal assembly. The cell was then filled with a 45 weight percent of potassium hydroxide solution. Each such cell was designated a "test" cell.

Exact replicates of the cells just described were built except that the negative electrodes in these cells contained no zinc titanate. They did, however, contain rayon fibers for strengthening the negatives in the manner disclosed in U. S. Pat. No. 3,271,195. These cells were designated "Controls."

Each cell was subjected to the same discharge/charge cycling regime, namely, charging at 0.25 amp. for 10 hr. and discharging at 1 amp. to 1 volt (100% DOD), until 50% of of initial cell capacity was reached. The results are shown in Table 3.

TABLE 3

| Designation | Cycles to Short | Avg. % Capacity Loss at Half Cycle |
| --- | --- | --- |
| Controls | 23–28 | 35 |
| Test | 47–52 | 2 |

We claim:

1. In a rechargeable electrochemical generator having a negative electrode comprising a relatively electronegative zinc electrode material which is in essentially elemental metallic form in a charged state of said generator, a positive electrode comprising a relatively electropositive electrode material in oxidized form in said charged state, and including an alkaline electrolyte in electrochemical contact with electrodes, the improvement which comprises:

an inorganic titanate compound dispersed in said zinc electrode material in an amount between about 0.2% by weight and about 1.8% by weight of the weight of said zinc electrode material in an uncharged state.

2. The improvement of claim 1 wherein said inorganic titanate compound is a material selected from the group consisting of sodium, potassium, calcium, magnesium and barium titanates, and mixtures thereof.

3. The improvement of claim 1 wherein said inorganic titanate compound is present in the form of fibers.

4. The improvement of claim 1 wherein said inorganic titanate compound is present in an amount between about 1.0% by weight and 1.5% by weight of the weight of said zinc electrode material in its uncharged state.

5. The improvement of claim 1 wherein said electronegative zinc electrode material is zinc oxide when in its uncharged state.

6. In a rechargeable electrochemical generator having a negative electrode comprising electrochemically active zinc oxide, a positive electrode comprising a material which is electropositive relative to said zinc oxide, and including an alkaline electrolyte in electrochemical contact with said electrodes, the improvement which comprises:

an inorganic titanate compound substantially homogeneously dispersed in said zinc oxide, said inorganic titanate compound being a material selected from the group consisting of sodium, potassium, calcium, magnesium and barium titanates, and mixtures thereof, and being present in said negative electrode in an amount between about 0.2% by weight and about 1.8% by weight of the weight of said zinc oxide.

7. The improvement of claim 6 wherein said inorganic titanate compound is present in the form of fibers.

8. In the improvement of claim 7 wherein said inorganic titanate compound is present in an amount between about 1.0% by weight and about 1.5% by weight of the weight of said zinc oxide.